Patented Sept. 11, 1951

2,567,546

UNITED STATES PATENT OFFICE 2,567,546

3-PHENYLPHTHALIDYL-3-ACETIC ACID

Alfred Burger, Charlottesville, Va., assignor to Smith, Kline & French Laboratories, Philadelphia, Pa., a corporation of Pennsylvania No Drawing. Application August 8, 1950,
Serial No. 178,343

1 Claim. (Cl. 260—344.6)

This invention relates to a new chemical compound, more particularly to 3-phenylphthalidyl-3-acetic acid.

The compound of this invention will find utility as an intermediate in the preparation of chemical compounds, and more particularly in the preparation of compounds having physiological activity.

Generally speaking, 3 - phenylphthalidyl - 3-acetic acid can be conveniently prepared by either of two methods starting either with the pseudo chloride or ortho-benzoylbenzoic acid, or starting with ortho-benzoylbenzoic acid.

*Method A.*—Preparation of 3-phenylphthalidyl-3-acetic acid may be accomplished from ortho-benzoylbenzoic acid by reacting it with an allylic Grignard reagent in the presence of an inert solvent and under reflux conditions. The Grignard reaction complex thus formed is then hydrolyzed in the presence of mineral acid, washed, dried, distilled and fractionated to obtain the 3-allyl-3-phenylphthalide. The allyl compound so formed is oxidized using a suitable oxidizing agent as, for example, potassium permanganate, to form the 3-phenylphthalidyl-3-acetic acid as set forth in the reaction below:

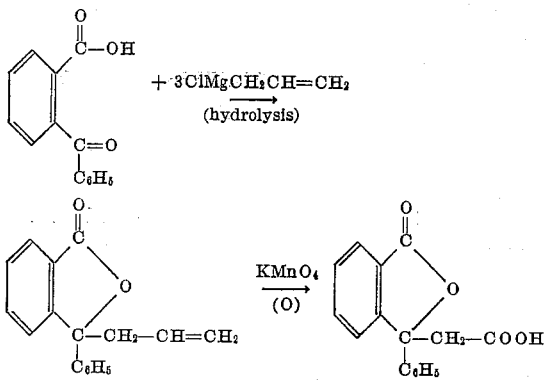

*Method B.*—Alternately, 3-phenylphthalidyl-3-acetic acid may be prepared from the pseudo acid chloride of ortho-benzoylbenzoic acid, which is prepared by halogenation of ortho-benzoylbenzoic acid with a suitable halogenating agent, as, for example, thionyl chloride. To this is added, after removal of the halogenating agent, the magnesium-ethoxy derivative of diethyl malonate with stirring and at reflux temperatures. Subsequent hydrolysis decomposes the reaction complex with the aid of a mineral acid such as sulphuric, hydrochloric, etc. and the diethyl 3-phenylphthalidyl-3-malonate is isolated by extraction, washing, and distillation.

The diethyl ester prepared above is hydrolyzed and decomposed by the addition of aqueous base, such as, for example, potassium hydroxide or sodium hydroxide, followed by refluxing gently. Distillation of the water and solvents and extraction of the tarry residue, followed by drying and evaporation and recrystallization yields the 3-phenylphthalidyl-3-acetic acid as indicated below:

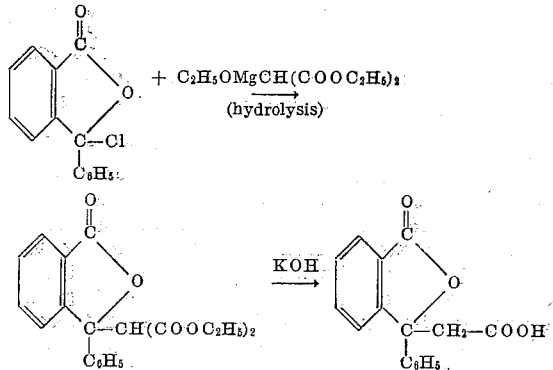

As specifically illustrative of the compound of this invention and the methods of its preparation are the following examples:

Example 1

Allyl magnesium chloride was prepared by suspending 24.3 g. of magnesium turnings in 500 cc. anhydrous ether to which is added a solution of 38.5 g. of allyl chloride in 450 cc. of anhydrous ether at the rate of about 2 cc. per minute. When the addition of the allyl chloride was completed (approximately 3½ hours) the mixture was stirred and refluxed for an additional 15 minutes.

A solution of 33.9 g. of o-benzoylbenzoic acid in 280 cc. of anhydrous ether was added over 1¼ hours to the suspension of the Grignard reagent prepared above and the ether was distilled out simultaneously at the same rate. Upon completion of the addition, 930 cc. of anhydrous benzene was added in portions and distillation was continued until the liquid temperature reached 80° C. following which the solution was refluxed for 11 additional hours without stirring.

The Grignard reaction complex was hydrolyzed to produce 3-allyl-3-phenylphthalide, by the cautious addition of 100 cc. of ice-cold water, excess magnesium was removed using decantation, and the hydrolysis was completed with 500 cc. of 9% hydrochloric acid. The benzene layer was then separated, washed with water and sodium bicarbonate solution until neutral. Drying and evaporating of the organic layer yielded an oily residue, the desired fraction of which distilled at 180–186° at 1 mm. Hg and had an $n_D^{25}$ of 1.5797. A second fractionation, obtained using a short column, yielded a pale amber distillate, boiling at 168–169.5° C. at 0.4 mm. Hg with an $n_D^{25}$ of 1.5808, and which upon further purification boiled at 153–154° C. with an $n_D^{25}$ of 1.5848.

A mixture of 1 g. of 3-allyl-3-phenylphthalide, prepared as above, 1.7 g. of KMnO₄ and 20 cc. of water was refluxed for 35 minutes and cooled. The manganese dioxide being removed by filtration, the filtrate was acidified carefully by concentrated hydrochloric acid. The liberated oil was extracted into benzene and the solution dried and evaporated. Addition of a small amount of chloroform to the residue caused precipitation of colorless crystals of 3-phenylphthalidyl-3-acetic acid which melted at 173–175° C.

*Example 2*

The pseudo acid chloride of o-benzoylbenzoic acid was prepared by treating 45.2 g. of the keto acid with 95.2 g. of thionyl chloride at room temperature. The resulting solution was warmed to 50° and maintained at this temperature while a stream of carefully dried air, preheated to 50°, was passed over the surface at atmospheric pressure. After 20 hours dry air was bubbled through the mixture for 5 hours until the excess thionyl chloride had been removed. The amber syrupy residue was allowed to cool to room temperature.

The magnesium-ethoxy derivative of diethyl malonate was prepared according to the directions of Walker and Hauser [J. Am. Chem. Soc. 68, 1386 (1946)] from 5.35 g. of magnesium and 35.2 g. of diethyl malonate. The pseudo acid chloride prepared above was dissolved in 100 cc. of absolute ether and added rapidly with good stirring to the magnesium diethyl malonate derivative, and a pale greenish, thick, syrupy precipitate formed. Stirring and refluxing were continued for an additional hour and the reaction mixture was allowed to stand overnight, cooled and decomposed with 130 cc. of ice-cold 37% sulphuric acid. Separation of the layers and extraction with ether, followed by extraction with sodium bicarbonate solution, 10%, and washing with water yielded an oily residue which was dried by distilling benzene from it. Addition of absolute ether yielded a precipitate of colorless diethyl 3 - phenylphthalidyl - 3 - malonate, which melted after recrystallization at 77–79° C.

To a solution of 2.5 g. of the diester prepared as above in 10 cc. of absolute ethanol was added 10 cc. of 40% aqueous potassium hydroxide upon which the mixture darkened instantly. After refluxing gently for one hour, water was added in portions and water and ethanol were distilled out simultaneously until a total of 30 cc. of water had been added and 30 cc. of distillate had been collected. The residue was extracted with benzene to remove tarry decomposition products and the alkaline layer acidified with concentrated HCl. Extraction of the liberated oil into benzene, followed by drying and evaporation yielded a microcrystalline material which precipitated upon the addition of a small amount of chloroform. Separation of the crystals followed by washing with cold chloroform and drying yielded the 3-phenylphthalidyl-3-acetic acid, which, upon recrystallization from ethanol and water melted at 175–177° C.

As exemplifying the utility of 3-phenylphthalidyl-3 acetic acid as an intermediate, it may be used for the preparation of N-(β-diethylaminoethyl) - 3 - phenylphthalidyl - 3 - acetamide which will have physiological activity.

By way of illustration, this N-(β-diethylaminoethyl)-3-phenylphthalidyl-3-acetamide will be prepared by refluxing a mixture of 8.0 grams of 3-phenylphthalidyl-3-acetic acid and 15 cc. of thionyl chloride. After refluxing for one hour, the excess thionyl chloride is removed by distillation under reduced pressure and three 50 cc. portions of dry benzene added and removed in vacuo. The warm oil thus produced is dissolved in 75 cc. of dry benzene and 7.0 grams of β-diethylaminoethylamine added. This mixture is then heated to reflux temperature for two hours followed by cooling and washing with two 25 cc. portions of sodium bicarbonate solution. The benzene solution is then washed with cold water until the washings are neutral to litmus. A solid separates which, on removal by filtration, washing and drying, gives white N-(β-diethylaminoethyl) - 3 - phenylthalidyl - 3- acetamide in the form of a white powder, melting point 128.5 to 130° C. Recrystallization from benzene and ether gives a melting point for the product of 129 to 129.5° C.

What is claimed is:
3-phenylphthalidyl-3-acetic acid.

ALFRED BURGER.

REFERENCES CITED

The following references are of record in the file of this patent:

Greenspan: Ind. Eng. Chem., 39, 847–848 (1947).